United States Patent [19]

Kikuya et al.

[11] Patent Number: 4,485,988

[45] Date of Patent: Dec. 4, 1984

[54] TAPE CASSETTE

[75] Inventors: Satoshi Kikuya, Katano; Hidemichi Sumisha, Hirakata; Seiko Minamide, Nara, all of Japan

[73] Assignee: Matsushita Electric Industrial Co., Ltd., Kadoma, Japan

[21] Appl. No.: 438,361

[22] Filed: Oct. 29, 1982

[30] Foreign Application Priority Data

Nov. 4, 1981 [JP] Japan ............................ 56-164596[U]
Jan. 25, 1982 [JP] Japan ................................ 57-9292[U]

[51] Int. Cl.$^3$ ............................................... G03B 1/04
[52] U.S. Cl. .................................... 242/198; 360/96.1; 206/387
[58] Field of Search ................ 206/387; 220/337, 342; 242/198; 360/132, 137, 93, 96

[56] References Cited

U.S. PATENT DOCUMENTS

| 3,900,172 | 8/1975 | Kamaya | 242/198 |
| 4,004,752 | 1/1977 | Kamaya | 242/198 |
| 4,033,523 | 7/1977 | Roman | 242/198 |
| 4,106,724 | 8/1978 | Higashida | 242/198 |
| 4,173,319 | 11/1979 | Umeda | 242/199 |
| 4,214,719 | 7/1980 | Kato | 242/198 |
| 4,225,100 | 9/1980 | Sugawara | 242/198 |

Primary Examiner—Joseph Man-Fu Moy
Assistant Examiner—David Fidei
Attorney, Agent, or Firm—Stevens, Davis, Miller & Mosher

[57] ABSTRACT

A tape cassette having a swingable cover adapted to cover and protect a tape stretched along the front side of the tape cassette, a cover locking member adapted to prevent swinging of the swingable cover by rotating in the thicknesswise direction of the tape cassette within a groove which is defined between the inner surface of one side wall of the swingable cover and the side wall of the box-like structure of the tape cassette and also between two side walls of the box-like structure which are on the extensions of the one side wall of the swingable cover and the above-mentioned side wall of the box-like structure. The groove serves also as a mis-insertion preventing groove for preventing the tape cassette from being inserted into the cassette holder in a wrong posture. According to this arrangement, it is possible to realize a compact construction while fulfilling all of the requisites for the tape cassettes.

5 Claims, 18 Drawing Figures

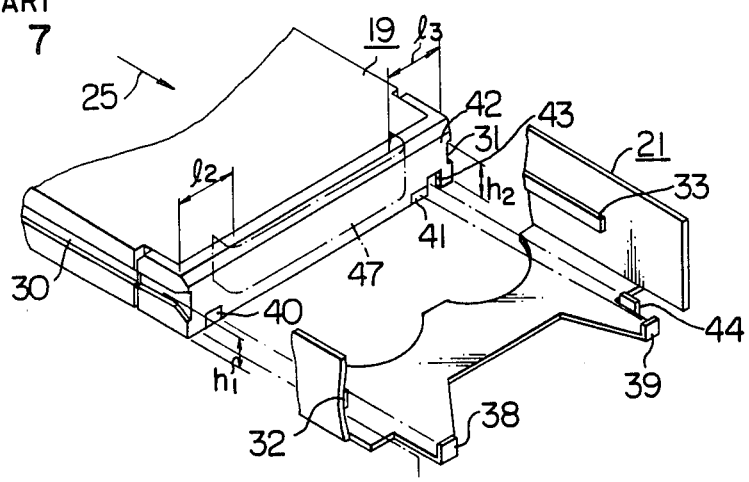

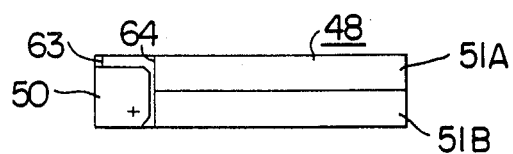
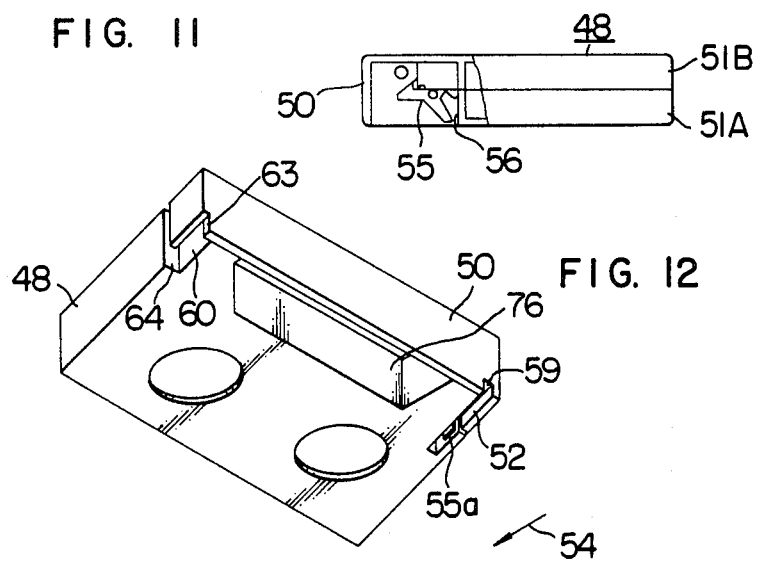
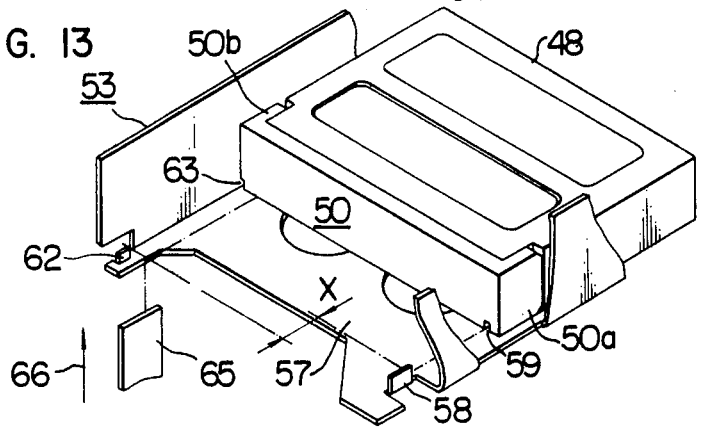

TAPE CASSETTE

BACKGROUND OF THE INVENTION

The present invention relates to a tape cassette for use in audio and video tape recorders, data recorders and so forth and, more particularly, to a tape cassette having a swingable cover usually covering and protecting the tape stretched at the front side of the tape cassette and being adapted to swing to expose the tape as necessitated, and as well as a cover lock which normally locks the cover against swinging.

Referring to FIG. 1 showing an essential part of a VHS type tape cassette, a conventional tape cassette 1 for use in, for example, a video tape recorder (VTR) has a cover 3 which is swingable around a shaft 3a so as to selectively cover and protect a tape 2 (shown by two-dot-and-dash line) stretched along the front side of the tape cassette 1. As will be seen from FIG. 2 which is an exploded perspective view, the swingable cover 3 is prevented from swinging by a lock member 4. When the tape cassette 1 is inserted into the cassette holder (not shown) of the VTR, a releasing member (not shown) attached to the cassette holder pushes a projection 5 on the locking member 4 in the direction of an arrow 6, so that the engagement between a recess provided in the cover 3 and a claw 7 provided on the locking member 4 as shown in FIG. 3 no longer exists (they are disengaged) as shown in FIG. 4, thereby permitting rotation of the cover 3 in the direction of the arrow 8 shown in FIG. 1.

The operation of the cover locking member 4 will be further explained with reference to FIG. 2 in which only the lower half part of the tape cassette 1 is shown to facilitate the understanding of the invention. The locking member 4 has a shaft 11 rotatably held by recesses 10 in the lower half part 9, and is biased by a spring 12 in the direction of the arrow 13 so as to make contact with the inner side of the wall 14 of the lower half part 9. The projection 5 of the locking member 4 and the locking claw 7 extend through holes 15 and 16 formed in the wall 14. As the releasing member (not shown) is moved in the direction of the arrow 6, the projection 5 is pushed so that the locking member 4 is rotated by a distance L in the direction of the arrow 17 as indicated by an arrow 17, thereby disengaging the cover 3 and the locking claw 7 as explained above in connection with FIGS. 3 and 4.

In the conventional cover locking means having the described construction, the unlocking motion takes place in the longitudinal direction of the tape cassette, so that the length constituting the locking means is increased as schematically shown in FIG. 5. This arrangement, therefore, is not suitable for use in a small tape cassette, although it can effectively be used for a comparatively large tape cassette. Namely, when this arrangement is applied to small-sized tape cassette, the length k of the opening for receiving a post (not shown) during extraction of the tape 2 is made small to make it difficult to extract the tape 2.

As typical examples of the tape cassette having a swingable cover, tape cassettes of the VHS system and the β system will be explained hereinunder, with reference to FIGS. 6 and 7, respectively. After mounting the tape cassette 18, 19 in a cassette holder 20, 21, the tape cassette 18, 19 is lowered together with the cassette holder 20, 21 in the direction opposite to the arrow 22, 23 to thereby load the tape cassette on the machine. In order to facilitate the understanding, the cassette holder 20, 21 in each of FIGS. 6 and 7 is shown in a schematic perspective view with its top panel removed. In order to prevent any insertion of the tape cassette 18, 19 fully into the loading position on the video tape recorders or the like in an erroneous orientation or posture such as upside down posture, the tape cassette 18, 19 is provided with asymmetrical grooves generally referred to as mis-insertion preventing grooves. More specifically, in the tape cassette 18 of the VHS system shown in FIG. 6, a notch 28 is formed substantially in the center of lower end of the swingable cover 27 which covers the tape (shown by one-dot-and-chain line) 26 stretched along the front surface of the tape cassette 18. In addition, mis-insertion preventing grooves (not shown) are provided in the bottom surface of the tape cassette 18 at positions corresponding to the notch 28. On the other hand, the cassette holder 20 is provided with protrusions 29 at its portions corresponding to these notch and grooves so that the tape cassette 18 can be fully received by the cassette holder 20 only when the tape cassette 18 is inserted in the correct posture. In this case, when there is slack in the tape 26 it causes an offset of the tape position from the correct position in the breadthwise and the tape 26 may be caught and damaged by the protrusion 29 accidentally. In addition, the notch 28 formed in the cover may undesirably permit foreign matter to come into the tape cassette even when the cover 27 is in position to completely cover the tape 26, so that the perfect protection of the tape may not be attained. Referring now to the tape cassette 19 of the β system, this tape cassette 19 is provided with mis-insertion preventing grooves 30, 31 formed in both side walls thereof at heights $h_1$ and $h_2$ as measured from the bottom thereof. The cassette holder 21 is provided with projections 32, 33 at portions thereof corresponding to the grooves 30, 31, so that the tape cassette 19 can be received by the cassette holder 21 only when the projections 32, 33 are aligned with associated grooves 30, 31, i.e. only when the tape cassette 19 is oriented correctly with respect to the cassette holder 21. In this case, since mis-insertion preventing grooves 30, 31 are formed in both side walls of the tape cassette 19, the breadth of the tape cassette is increased correspondingly, which goes quite contrary to the demand for a reduction in size of the tape cassette. The tape cassette and cassette holder shown in each of FIGS. 6 and 7 employs the following arrangement in order to correctly position the tape cassette 18, 19 within the cassette holder 20, 21 in the direction of insertion, thereby to ensure the correct loading of the tape cassette in the video tape recorder or the like. Namely, in the tape cassette the VHS system shown in FIG. 6, contact portions 36, 37 are formed on the portions of the front surface thereof corresponding to protrusions 34, 35 on the cassette holder 20. On the other hand, the tape cassette 19 of the β system shown in FIG. 7 has contact portions 40, 41 formed in the portions of the front surface thereof corresponding to the protrusions 38, 39 provided on the cassette holder 21. In order to prohibit the opening of the swingable cover 27 when the tape cassette 18, 19 is not used, each tape cassette is provided with a cover lock (not shown). More specifically, in the tape cassette of the VHS system shown in FIG. 6, the locking is effected by mutual engagement between the cover locking member (see FIG. 2) and a projection 5, as explained before. For unlocking the cover, an unlocking member (not shown) provided on the cassette holder 20 presses the projection 5 when the insertion of the tape cassette 18 in the direction of the arrow 24 is completed. In the β system shown in FIG. 7, the following unlocking arrangement is employed. As notch 43 is formed in the swingable cover 42 so as to cover the tape 47 (shown by one-dot-and-dash-line) stretched along the front side of the tape cassette 19. A groove (not shown) is provided in the bottom side of the tape cassette 19 in the position corresponding to the notch 43. An unlocking portion (not shown) facing the above-mentioned groove is moved by a protrusion 44 on the cassette holder 21 which comes into the notch 43 as the tape cassette 19 is inserted in the direction of the arrow 25, so that the cover is unlocked.

In each of the arrangements shown in FIGS. 6 and 7, there is provided a cover opening member 45, 46 which is adapted to be raised in the direction of the arrow 22, 23 to lift the lower end of the cover 27, 42 to thereby open the latter, as the cassette holder 20, 21 together with the tape cassette 18, 19 is moved downward into the video tape recorder or the like. Grooves (not shown) are formed in the tape cassette 18, 19 to present a passage for the cover opening member coming into the tape cassette 18, 19.

In the conventional arrangements shown in FIGS. 6 and 7, it is necessary to dispose on the front side of the tape cassette 18, 19 all of the members or parts such as the mis-insertion preventing grooves 30, 31 (omitted from FIG. 6), contact portions 36, 37, 40, 41 for correctly positioning the tape cassette 18, 19 in the cassette holders 20, 21, projection 5 (omitted from FIG. 7) for unlocking the swingable cover 27, 42, and the grooves (not shown) presenting the passageways for the cover opening member 45, 46 for opening the cover 27, 42.

In consequence, large lengths are required for accomodating these members or parts, as indicated at $l_1$ and $l_2$, $l_3$ in FIGS. 6 and 7, respectively. Such large lengths could be obtained when the tape cassette has a comparatively large size but can hardly be obtained when the tape cassette has a small size. Thus, the conventional arrangements shown in FIGS. 6 and 7 are quite unsuited for small-sized tape cassette intended for use in a compact instrument such as a video tape recorder in which the tape stretched on the front side of the instrument is pulled out by an inner post to form a predetermined tape path.

SUMMARY OF THE INVENTION

Accordingly, a first object of the invention is to realize a compact construction of a tape cassette by reducing the length of the cover locking mechanism in the longitudinal direction of the tape cassette, the cover locking mechanism being adapted to lock and prevent a cover from opening unnecessarily from the position covering the front surface of a tape stretched along the front side of the tape cassette.

A second object of the invention is to provide a tape cassette having a tape extraction opening through which the tape stretched at the front side is extracted by the operation of a post or the like behind the tape, wherein a sufficiently large length of the tape extraction opening is preserved in the longitudinal direction of the tape cassette even when the size of the tape cassette is extremely small.

A third object of the invention is to provide a tape cassette which is adapted to be received by a cassette holder which is moved in the video tape recorder or the like to load the tape cassette in the right position, wherein the aforementioned cover locking function and the mis-insertion preventing function for limiting the direction of insertion of the tape cassette with respect to the cassette holder are simultaneously realized by a simple construction.

A fourth object of the invention is to provide a tape cassette improved to facilitate the movement of a cover opening member into the tape cassette, while achieving the above-mentioned cover locking function and the mis-insertion preventing function simultaneously.

A fifth embodiment of the invention is to provide a tape cassette in which a function for positioning the tape cassette in the cassette holder is achieved, together with the above-mentioned functions for locking the cover, mis-insertion prevention and facilitation of movement of the opening member, is realized by a compact construction.

To these ends, the invention provides a tape cassette having a swingable cover for covering and protecting a tape stretched at the front side of the tape cassette, characterized by comprising a cover lock which usually engages with the cover to prevent the latter from being swung but is rotated in a plane extending in the thicknesswise direction of the tape cassette by an unlocking member inserted from the outside so as to be disengaged from the cover thereby to permit the latter from swinging to an opening position.

According to one aspect of the invention, the cover lock is made to rotate in the plane extending in the thicknesswise direction of the tape cassette, within a groove formed by the side walls of a housing opposing to one side wall of the swingable cover perpendicular to the longitudinal direction of the tape stretched at the front side and the side walls of the housing which extend substantially on the extensions of the first-mentioned side walls.

According to another aspect of the invention, the cover locking member is rotatable in the thicknesswise direction of the tape cassette within the groove portion defined by side walls spaced from each other and opposing to the inner surface of one of the side walls of the swingable cover perpendicular to the longitudinal direction of the tape stretched at the front side of the tape cassette and by two side walls which are on the extensions of the side walls of the housing.

According to still another aspect of the invention, a notch is formed in the lower portion of the front side of the swingable cover at a position corresponding to the groove portion. The notch and the part of the groove portion corresponding to the height of the notch from the bottom surface of the tape cassette in combination form a passageway for permitting the unlocking member to come into the tape cassette from the front side. At least one of the position of the passageway, height of the passageway from the bottom surface of the tape cassette and the depth of insertion of the unlocking member from the front surface of the tape cassette is determined to impart a geometrical assymmetry to the tape cassette.

According to a further aspect of the invention, an unlocking end of the cover locking member is disposed so as to face the front surface of the tape cassette through the bottom surface of the tape cassette and the notch, in the area near the terminal end of the passageway. Furthermore, a contact portion is provided on the housing so that the unlocking member reached to the area near the terminal end of the passageway contacts with the unlocking end of the cover locking member and also with the housing.

BRIEF DESCRIPTION OF THE DRAWINGS

FIGS. 6 and 7 are perspective views of conventional tape cassette;

FIG. 8 is a partly sectioned plan view of a tape cassette in accordance with a first embodiment of the invention;

FIG. 9 is a front elevational view;

FIG. 10 is a left side elevational view;

FIG. 11 is a right side elevational view;

FIG. 12 is a perspective view as viewed from the lower side;

FIG. 13 is a perspective view illustrating the loading operation;

DESCRIPTION OF THE PREFERRED EMBODIMENT

Figure 1:
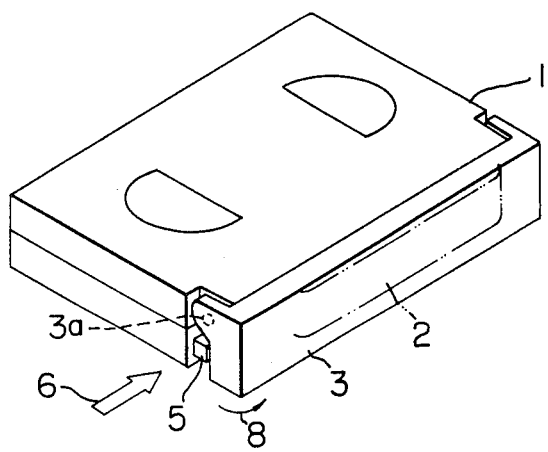
FIG. 1 is a perspective view of a conventional tape cassette.
Figure 2:
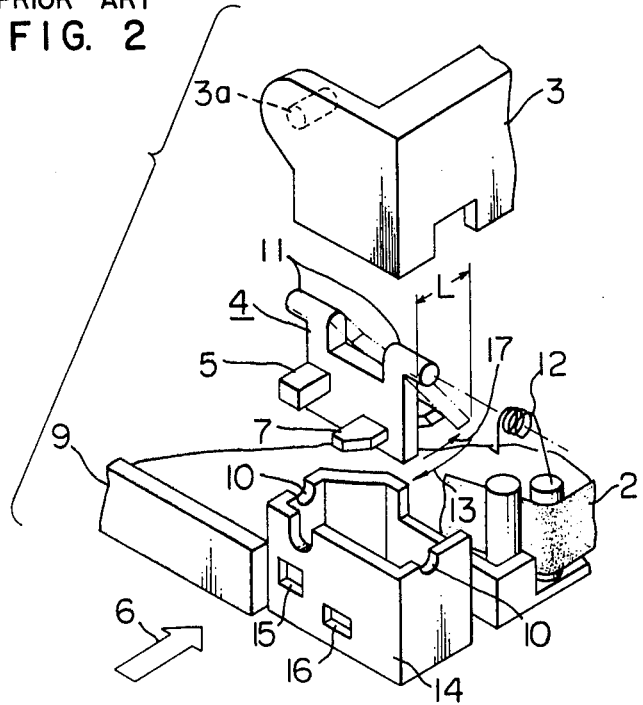
FIG. 2 is an exploded perspective view of an essential part of the tape cassette shown in FIG. 1.
Figure 3:
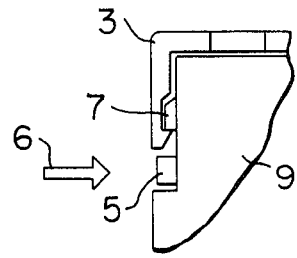
FIGS. 3 and 4 are plan views illustrating the operation of essential parts of the tape cassette shown in FIG. 1.
Figure 4:
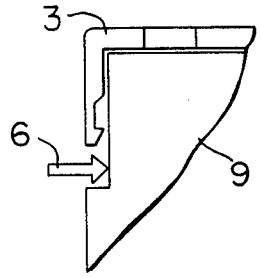
Figure 5:
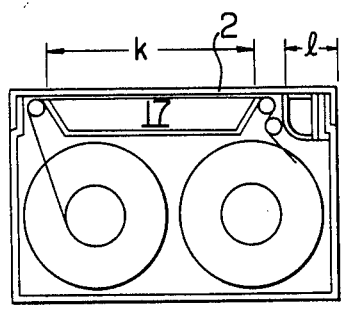
FIG. 5 is a schematic plan view of a conventional tape cassette.
Figure 6:
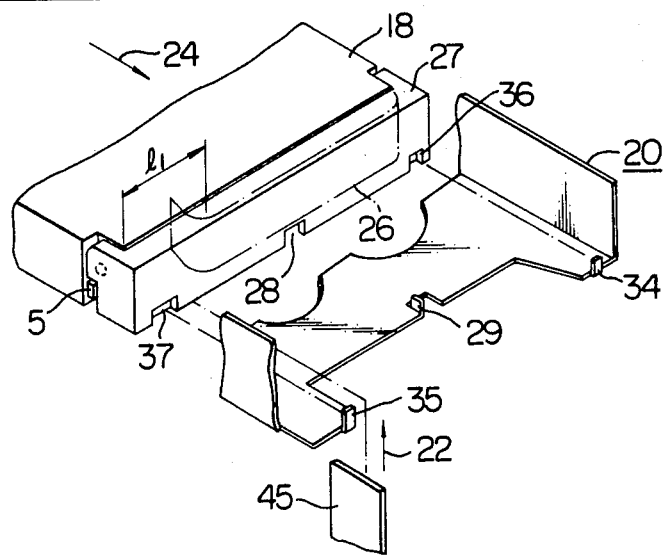

A tape cassette in accordance with a first embodiment of the invention will be described hereinunder with reference to FIGS. 8 to 16. The tape cassette 48 has a box-like structure composed of an upper half part 51B and a lower half part 51A, and is provided with a swingable cover 50 adapted to cover and protect a tape 49 (see FIG. 8) stretched along the front side of the tape cassette 48. As shown in FIGS. 8 and 12, a first groove portion 52 is provided at the right side portion of the tape cassette 48 as viewed from the front side thereof. The first groove portion 52 is defined by the side walls 5 of the box-shaped structure of the tape cassette 48 which opposes to and is spaced substantially from the side wall 50a of the swingable cover 50 extending perpendicularly to the longitudinal direction of the tape 49 stretched at the front side of the tape cassette 48, as well as by the extension of the side wall 51a and the side wall 51b of the box-shaped structure on the extension of the side wall 50a. An unlocking end 55a (see FIGS. 14 and 15) of the cover locking member 55 is positioned within the first groove portion 52 at the forward side as viewed in the direction 54 of insertion of the tape cassette into the cassette holder 53. A first contact portion for positioning the tape cassette within the cassette holder 53 in the direction of insertion is provided at the back side as viewed in the direction 54 of insertion. An unlocking member for disengages the cover locking member 55 is formed by a protrusion on the bottom surface 57 of the cassette holder 53. Also provided is a positioning means 58 for positioning the tape cassette in the direction of insertion. The unlocking member and the positioning means 58 are adapted to be moved into the first groove portion 52 as the tape cassette 48 is inserted in the direction 54. To permit the movement of the unlocking member and the positioning means into the first groove portion 52, a first notch 59 is formed in the portion of the swingable cover corresponding to the first groove portion 52. More specifically, a passageway for the unlocking member for disengaging the cover locking member 55 and the positioning means 58 is formed by the notch 59 and the part of the first groove portion of a height range corresponding to the height of the notch 59 from the bottom surface of the tape cassette 48. As shown in FIG. 12, the unlocking end 55a of the cover locking member 55 faces the front surface of the tape cassette 48 through the bottom surface of the tape cassette 48 and the notch 59, in the area near the terminal end of this passageway. As will be seen from FIG. 12, an opening 76 is formed in the bottom surface of the tape cassette 48. This opening 76 receives a post or the like member (not shown) adapted for extracting the tape 49 stretched along the front side of the tape cassette 48. A second groove portion 61 is formed to have a side wall surface constituted by the inner surface of a side wall 50b of the swingable cover 50 substantially spaced from the left side wall 60 of the tape cassette 48 as viewed from the front side of the latter. Positioning means 62 for positioning the tape cassette 48 in the direction of insertion is formed by a protrusion from the bottom surface 57 of the cassette holder 53 (see FIG. 13). This positioning means 62 is adapted to be moved into the second groove portion 61 as the tape cassette 48 is inserted in the direction 54, through a second notch 63 formed in the swingable cover 50 at a position corresponding to the side wall 50b outside of the second groove 61 in the breadthwise direction of the tape cassette 48. A second contact portion 64 is provided on the tape cassette 48 at the forward side of the positioning means 62 as viewed in the direction of insertion of the tape cassette 48. Thus, the positioning of the tape cassette 48 within the cassette holder 53 at the time of completion of the insertion is made by the mutual engagement of the unlocking member for disengaging the cover locking member 55 and the positioning means 58 with the first contact portion 56 and, at the same time, by the engagement between the positioning means 62 and the second contact portion 64. In the illustrated embodiment, the distances of the first contact portion 56 and the second contact portion 64 from the front surface of the tape cassette 48 differ from each other as indicated by Y and Z in FIGS. 15 and 16, respectively. Namely, there is an offset X ($X=Y-Z$) between two contact portions in the direction of movement, i.e. in the direction opposite to the insertion direction. This offset is provided for dismissing the cover locking means 55. In the described embodiment, as stated before, the passageway for the unlocking member for disengaging the cover locking member 55 and the positioning means 58 is provided by the notch 59 and the first groove portion 52 continuing from the notch 59. The position of the passageway, the height of the passageway from the bottom surface of the tape cassette, and the depth of insertion of the unlocking member and the positioning means 58 (indicated at Y in FIG. 15) as measured from the front surface of the tape cassette are determined to impart a geometric assymmetry to the tape cassette 48. Namely, when the tape cassette 48, which is to be inserted in the posture shown in FIG. 13, is going to be inserted in a wrong posture such as upside down or back side forth, it is not possible to fully insert the tape cassette 48 into the cassette holder 53 because the unlocking member and the positioning means 58 do not align with the passageway. Thus, the passageway formed by the notch 59 and the first groove portion 52 continuing from the notch 59 serve as a mis-insertion preventing means for preventing erroneous insertion of the tape cassette 48 into the cassette holder 53. The same applies also to the second groove portion 60. On the other hand, the opening of the swingable cover 50 is made in the following manner. After the completion of insertion of the tape cassette 48 into the cassette holder 53, the dismissal of the cover locking member 55 is made in a manner which will be explained later. Then, as the cassette holder 53 is depressed into the video tape recorder or the like, a cover opening means 65 is moved relatively into the second groove portion 61 of the tape cassette 48 in the direction of the arrow 66, so that the lower end of the swingable cover 50 facing the second groove portion 61 is lifted to make the swingable cover swing around the axis of the shaft 50c in the direction of the arrow 67.

Although not shown, it is possible to adopt the following modification. Namely, since the unlocking end 55a of the cover locking member 55 is positioned near the terminal end of the passageway mentioned before, the part of the first groove portion behind the tape cassette 48 is kept opened after the disengagement of the cover locking member 55. It is possible to use this opened portion as the passageway for the second cover opening means. In such a case, it is possible to obtain a smoother and stable opening of the swingable cover without any problem such as twisting of the swingable cover.

Figure 14:
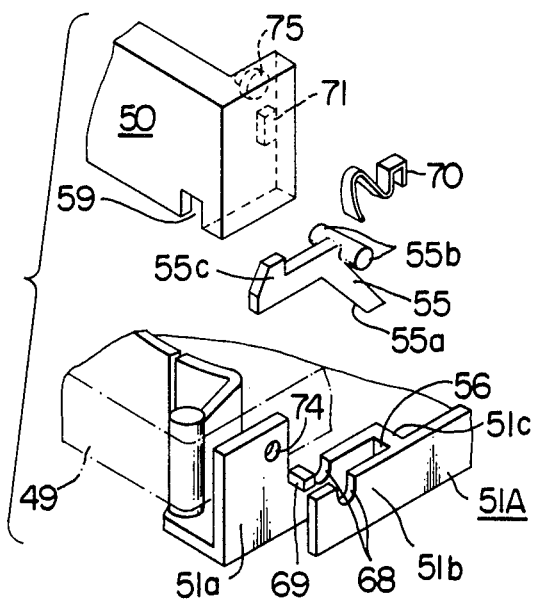
FIG. 14 is an exploded perspective view of an essential part.
Figure 15:
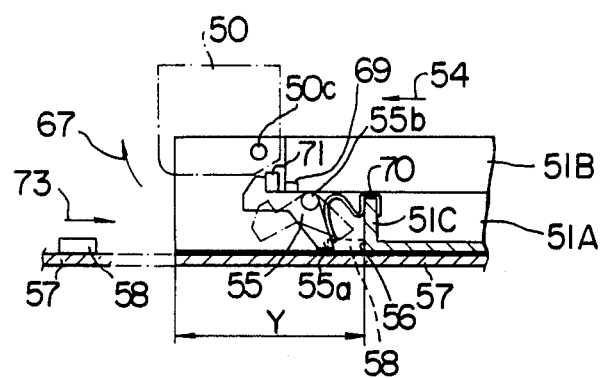
FIGS. 15 and 16 are illustrations of operation.
Figure 16:
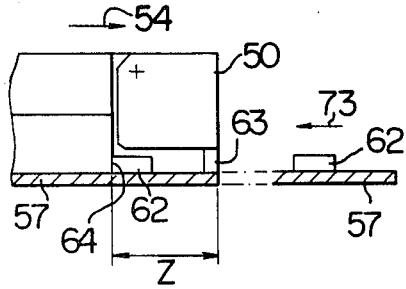

Hereinafter, the construction and operation of the cover locking member 55, as well as the positioning of the tape cassette 48, will be made with specific reference to FIGS. 14 to 16. The cover locking member 55 has a shaft 55b rotatably held by recesses 68 provided in the side walls 51a, 51b of the lower half part 51A constituting one of the halves of the box-like structure of the tape cassette 48. The cover locking member 55 is rotationally biased by a leaf spring 70 which is secured to a rear wall 51c which interconnects both side walls 51a, 51b in the longitudinal direction of the tape 49 stretched along the front side of the tape cassette 48. The rotation of the cover locking member 55 is limited by a projection 69 formed on the side wall 51a. The shaft portion 55b of the cover locking member 55 and the leaf spring 70 are clamped by the upper half part 51B constituting the other half of the box-like structure, to thereby ensure stable biasing and holding operation, as well as easy assembling. A projection 71 formed on the inner surface of the swingable cover 50 engages with the engaging end 55c of the cover locking member 55 to thereby prevent the rotation of the swingable cover 50 in the direction of the arrow 67 (see FIG. 15). As the tape cassette 48 is inserted into the cassette holder 53, the unlocking member for disengaging the cover locking member 55 and the positioning means 58, which are formed on the bottom surface 57 of the cassette holder as shown in FIG. 15, is moved into the first groove portion 52 as indicated by an arrow 73, so that the engaging end 55c of the cover locking member 55 is pushed in the direction of the arrow 73 overcoming the force of the leaf spring 70 to cause a rotation of the cover locking member 55 thereby to disengage the engaging end 55c of the cover locking member 55 from the projection 71 of the swingable cover 50, while simultaneously achieving the positioning of the tape cassette 48 within the cassette holder in the direction of the insertion. At the same time, as shown in FIG. 16, the positioning means 62 reaches the second contact portion 64 at the left side of the tape cassette 48, thereby to complete the positioning of the tape cassette 48.

A shaft 75 is provided to protrude from the inner surface of the side wall 50a and is received by the hole 74 in the side wall 51a. The shaft 75 receives a torsion coiled spring which provides a rotational biasing force in the direction opposite to the arrow in FIG. 15 and having a force greater than that of the leaf spring 70. The torsion coiled spring is retained at its one end by a portion of the swingable cover 50 and at its other end by the halves 51A, 51B of the box-like structure of the tape cassette 48. Therefore, when the cassette holder 53 is moved to a position for permitting the withdrawal of the tape cassette 48 therefrom, the swingable cover 50 is rotated in the direction opposite to the arrow 67 around the axis of the shaft 75 so that a lock is effected again by the cover locking member 55.

Figure 17:
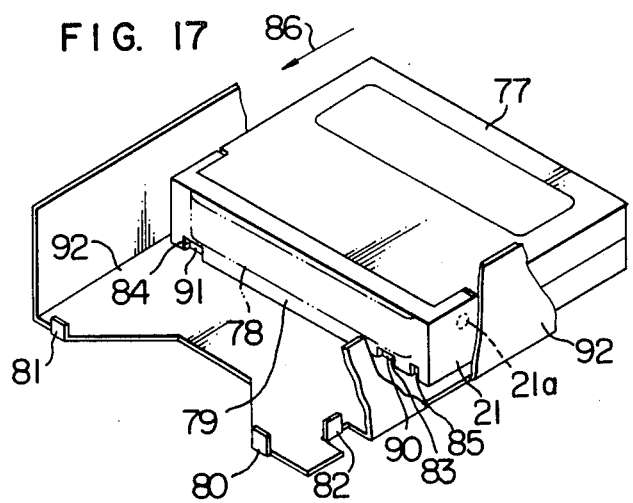
FIG. 17 is a perspective view of a tape cassette in accordance with a second embodiment of the invention illustrating also the manner of loading of the tape cassette.

A second embodiment of the invention will be explained hereinunder with reference to FIGS. 17 and 18.

The second embodiment is discriminated from the first embodiment in that the swingable cover 50 is devoid of the notch 63 in the first embodiment and that the first contact portion 56 (see FIGS. 14 and 15) and the second contact portion 64 (see FIG. 12) are disposed at positions different from those in the first embodiment. FIG. 17 shows how a tape cassette 77 is inserted into a cassette holder 78. For facilitating the understanding, the cassette holder 78 is shown in a fragmentary perspective view with its top panel removed. FIG. 18 is a schematic plan view showing the internal structure of the tape cassette 77.

Namely, the swingable cover 79 swingable to a position for covering and protecting the tape 78 stretched along the front side of the tape cassette 77 is provided with notches 83, 84 and 85 corresponding to the projections 80, 81, 82 formed on the cassette holder 92. The projections 80 and 81 are intended for the positioning of the tape cassette 77 in the direction 86 of insertion into the cassette holder 92, while the projection 82 corresponds to the unlocking member for disengaging the cover locking member (not shown). As shown in FIG. 18, an opening 87 is formed in the bottom surface of the tape cassette 77, for movably receiving a post or the like member (not shown) which is adapted to extract the tape 78 stretched along the front side of the tape cassette 77 into the running position. The aforementioned notches 83 and 84 are formed outside the span n of the opening 87, i.e. in the portions between both edges of the opening 87 and the groove 88, and the side wall 79b of the swingable cover 79. Contact portions 90 and 91 are provided to positions corresponding to these notches 83, 84. A groove portion 88 is formed by a side wall 89a opposing to the inner surface of the side wall 79a of the swingable cover 79 and the side wall 89b of the box-like structure on the extension of the side wall 79a. A cover locking member (not shown) of the same construction as that of the first embodiment shown in FIG. 14 is disposed in the groove portion 88 for rotation in a plane extending in the thicknesswise direction of the tape cassette 77. In the inserted state of the tape cassette 77 in which the projections 80 and 81 contact the contact portions 90 and 91, the projection 82 is not in contact with the terminal end of the groove portion 88, although it has disengaged the cover locking member (not shown) from the locking state. The passageway for the unlocking member 82 is presented by the notch 85 and the part of the groove portion 88 of the height range corresponding to the height of the notch 85 from the bottom surface of the tape cassette 77. The position of the passageway, the height of the passageway from the bottom of the tape cassette 77 and the depth of insertion of the unlocking member are suitably determined to impart a geometrical assymmetry to the tape cassette 77. As in the first embodiment, by positioning the unlocking end of the cover locking member (not shown) at the terminal end portion of the groove portion 88, it is possible to make use of the front part of the groove portion 88 as the accessway for the cover opening member into the groove portion 88 in order to open the swingable cover 79.

Figure 18:
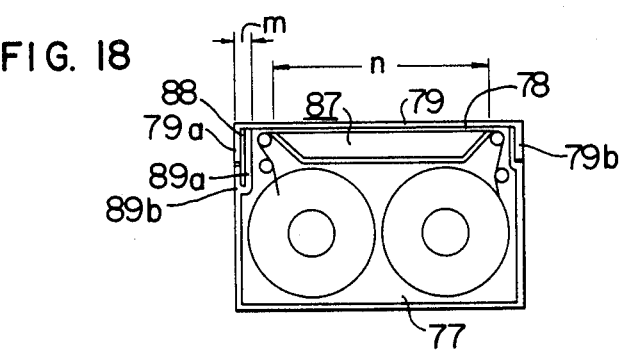
FIG. 18 is a schematic plan view showing the internal structure of the tape cassette.

As has been determined, according to the invention, it is possible to remarkably reduce the length m of the cover locking member in the longitudinal direction of the tape cassette as schematically shown in FIG. 18 by a plan view, by arranging it such that the cover locking member is rotatable in the plane extending in the thicknesswise direction of the tape cassette. This means that the opening for movably receiving the post or the like member for extracting the tape stretched at the front side of the tape cassette can have a sufficiently large length n even in an extremely small-sized tape cassette. It is thus possible to realize a compact construction of the tape cassette of the kind described. Furthermore, the tape cassette of the invention can fulfill, with quite a simple arrangement in the region outside the span of the tape stretched at the front side of the tape cassette, all of the requisites such as prevention of erroneous insertion, positioning of the tape cassette in the direction of insertion, disengagement of the locking of the swingable cover, permission of movement of the cover opening member and so forth, while avoiding attaching of dusts to the tape, as well as damaging of the tape during insertion of the tape cassette attributable to a slack of the tape. Furthermore, the lengths $l_4$ and $l_5$ in the breadthwise direction of the tape cassette as shown in FIG. 8 can be remarkably reduced to further contribute to the reduction in size of the tape cassette.

What is claimed is:

1. A tape cassette adapted to be loaded in a tape recorder having an unlocking member, comprising:
   a casing comprising a bottom side defined by a bottom surface, a front side defined by a front surface along which a tape is stretched and two lateral sides, at least one of said lateral sides being defined by a side wall having a front end part where said side wall is bifurcated so as to have first and second side extension walls;
   a swingable cover swingably carried by said casing for covering and protecting said tape stretched along said front surface, said swingable cover comprising a front part and side walls each having an inner surface;
   a groove comprising a first portion defined between said first and second side extension walls and a second portion defined between said second side extension wall and said inner surface of one of said side walls of said swingable cover;
   a notch formed in said front part of said swingable cover in a position corresponding to said groove, for allowing said unlocking member of said tape recorder to enter into said groove therethrough;
   a cover locking member pivotally supported by at least one of said first and second side extension walls so as to be rotatable in said groove portion within a plane extending in the thicknesswise direction of said tape cassette, said cover locking member comprising an engaging end adapted to be engaged with said swingable cover and an unlocking end facing to said front surface of said cassette through said notch, said cover locking member being normally engaged with said swingable cover at said engaging end for inhibiting said swingable cover from rotating, but being rotated, when said unlocking member which enters into said groove from said front surface through said notch, abuts against and moves said unlocking end to disengage said engaging end from said swingable cover thereby allowing said swingable cover to rotate; and,
   a biasing spring for biasing said cover locking member into engagement at the engaging end thereof with said swingable cover.

2. A tape cassette according to claim 1, wherein said notch and said groove portion define a passageway having a terminal end, for introducing said unlocking member, said passageway facing said front surface of said cassette, opposing to said swingable cover and being arranged in a position where it imparts a geometrical assymetry to said tape cassette with respect to an imaginary center point in both thickness and widthwise direction of said tape cassette.

3. A tape cassette according to claim 1, further comprising: a rear wall interconnecting the side extension walls of said tape cassette in the longitudinal direction of said tape stretched along the front side of said tape cassette, and a leaf spring having one end engaging with said cover locking member within said groove portion and biasing said locking member into engagement with said swingable cover.

4. A tape cassette according to claim 2, wherein said cover locking member has an unlocking end which faces the bottom and front surfaces of said tape cassette through said notch in the area near the terminal end of said passageway.

5. A tape cassette according to claim 4, wherein said unlocking member, when moved into said passageway to a depth near said terminal end, contacts said unlocking end of said cover locking member thereby to disengage said cover locking member from said swingable cover and has a contact portion for contacting said tape cassette.

* * * * *